United States Patent
Wang et al.

(10) Patent No.: US 9,430,023 B2
(45) Date of Patent: Aug. 30, 2016

(54) SLEEP STATE VIDEO INTERFACE OF AN INFORMATION HANDLING DEVICE

(75) Inventors: Song Wang, Cary, NC (US); Howard Locker, Cary, NC (US); John Miles Hunt, Raleigh, NC (US); John Weldon Nicholson, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 639 days.

(21) Appl. No.: 13/532,654

(22) Filed: Jun. 25, 2012

(65) Prior Publication Data

US 2013/0346776 A1 Dec. 26, 2013

(51) Int. Cl.

| G06F 1/00 | (2006.01) |
| --- | --- |
| G06F 1/32 | (2006.01) |
| G06F 3/14 | (2006.01) |
| H04N 21/41 | (2011.01) |
| G06F 1/16 | (2006.01) |
| G06F 1/20 | (2006.01) |
| G06F 1/26 | (2006.01) |
| H04N 21/414 | (2011.01) |

(52) U.S. Cl.
CPC .............. *G06F 1/3215* (2013.01); *G06F 3/14* (2013.01); *G06F 1/1616* (2013.01); *G06F 1/1632* (2013.01); *G06F 1/1654* (2013.01); *G06F 1/203* (2013.01); *G06F 1/266* (2013.01); *G06F 1/3218* (2013.01); *G06F 1/3265* (2013.01); *G06F 1/3287* (2013.01); *G09G 2330/022* (2013.01); *H04N 21/4122* (2013.01); *H04N 21/4126* (2013.01); *H04N 21/41407* (2013.01)

(58) Field of Classification Search
CPC .. G06F 1/1616; G06F 1/1632; G06F 1/1654; G06F 1/3218; G06F 1/3265; G06F 3/14; G06F 1/266; G06F 1/32; G06F 1/3287; G06F 1/203; H04N 21/4126; H04N 21/41407; H04N 21/4122
USPC ........................................................ 713/323
See application file for complete search history.

(56) References Cited

U.S. PATENT DOCUMENTS

| 5,978,923 | A  | * | 11/1999 | Kou ............................... 713/323 |
| 7,089,431 | B2 | * | 8/2006  | Matsuo et al. ................ 713/300 |
| 2002/0085348 | A1 | * | 7/2002 | Dai ............................... 361/686 |
| 2003/0014576 | A1 | * | 1/2003 | Lee .................................. 710/62 |
| 2003/0126620 | A1 | * | 7/2003 | Hayakawa ..................... 725/133 |
| 2006/0212733 | A1 | * | 9/2006 | Hamilton ....................... 713/300 |
| 2006/0245720 | A1 | * | 11/2006 | Obara ................ H04N 21/4143 386/232 |
| 2009/0044028 | A1 | * | 2/2009 | Wong et al. ................... 713/300 |
| 2009/0086030 | A1 | * | 4/2009 | Takamiya ................... 348/207.1 |
| 2010/0033433 | A1 | * | 2/2010 | Utz et al. ....................... 345/168 |
| 2010/0250984 | A1 | * | 9/2010 | Lee et al. ....................... 713/320 |
| 2011/0179300 | A1 | * | 7/2011 | Suzuki ................... G11B 19/00 713/323 |
| 2012/0173902 | A1 | * | 7/2012 | Zawacki et al. .............. 713/320 |
| 2013/0021351 | A1 | * | 1/2013 | Chen et al. .................... 345/519 |

* cited by examiner

*Primary Examiner* — Xuxing Chen
(74) *Attorney, Agent, or Firm* — Kunzler Law Group

(57) ABSTRACT

An apparatus for a sleep state video interface of an information handling device includes a storage device storing machine-readable code and a processor executing the machine-readable code. The apparatus includes a notification module receiving a sleep notification to place an information handling device into a sleep state. The information handling device receives a video signal. The apparatus includes a sleep module entering the information handling device into the sleep state in response to the notification module receiving the sleep notification. The video signal passes through the information handling device to a display as the information handling device is in the sleep state.

18 Claims, 6 Drawing Sheets

SLEEP STATE VIDEO INTERFACE OF AN INFORMATION HANDLING DEVICE

FIELD

The subject matter disclosed herein relates to a video interface and more particularly relates a sleep state video interface of an information handling device.

BACKGROUND

Description of the Related Art

The use of portable information handling devices, such as smartphones and personal desktop assistants ("PDA"s), has proliferated, and with it, the capabilities of these portable information handling devices. For example, a user may store and stream various kinds of content on the user's smartphone. Current portable information handling devices such as smartphones and tablet computers often have video output capabilities which allow them to connect to devices having video input such as monitors and televisions.

Often, personal computers and laptops lack video input ports, such as HDMI ports, leaving a user without the option of displaying video from his or her mobile device. Furthermore, even information handling devices that include some form of video input typically receive video input while operating at full power.

BRIEF SUMMARY

Based on the foregoing discussion, the inventors have recognized a need for an apparatus, system, and method for a sleep state video interface of an information handling device. Beneficially, such an apparatus, system, and method would place an information handling device into a sleep state while a video signal passes through the information handling device to a display.

The embodiments of the present subject matter have been developed in response to the present state of the art, and in particular, in response to the problems and needs in the art that have not yet been fully solved by currently available information handling devices. Accordingly, the embodiments have been developed to provide a method, apparatus, and system for a sleep state video interface of an information handling device.

An apparatus is provided with a storage device storing machine-readable code, a processor executing the machine-readable code, and a plurality of modules configured to functionally execute the steps for a sleep state video interface of an information handling device. These modules in at least a portion of the described embodiments include a notification module and a sleep module.

In one embodiment, the notification module receives a sleep notification to place an information handling device into a sleep state. The information handling device, in one embodiment, receives a video signal. In one embodiment, the sleep module enters the information handling device into the sleep state in response to the notification module receiving the sleep notification. In one embodiment, the video signal passes through the information handling device to a display as the information handling device is in the sleep state.

A method is also presented; in the disclosed embodiments, the method substantially includes the steps to carry out the functions presented above with respect to the operation of the described apparatus. In one embodiment, the method includes receiving a sleep notification to place an information handling device into a sleep state. The information handling device in one embodiment, receives a video signal. In one embodiment, the method includes entering the information handling device into the sleep state in response to receiving the sleep notification. The video signal, in one embodiment, passes through the information handling device to a display as the information handling device is in the sleep state.

A computer program product including a storage device storing machine readable code executed by a processor to perform operations is also presented. In one embodiment, operations include receiving a sleep notification to place an information handling device into a sleep state. The information handling device in one embodiment, receives a video signal. In one embodiment, the operations include entering the information handling device into the sleep state in response to receiving the sleep notification. The video signal, in one embodiment, passes through the information handling device to a display as the information handling device is in the sleep state.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
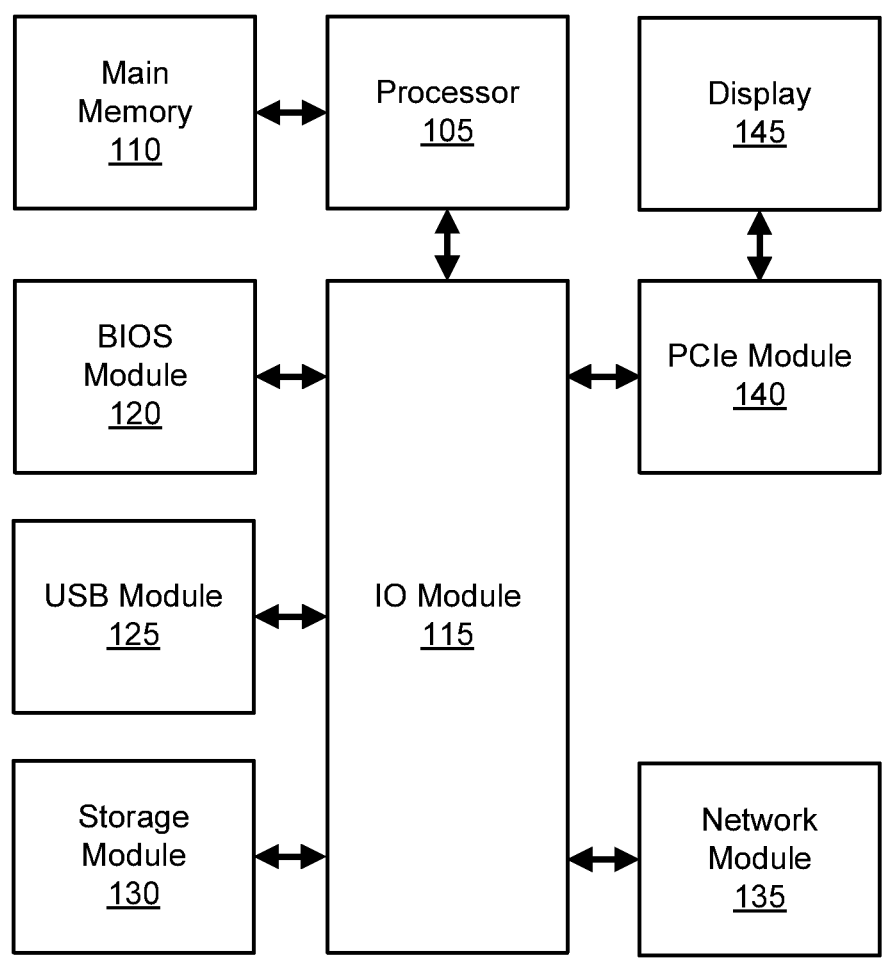
FIG. 1 is a schematic block diagram illustrating one embodiment of an information handling device in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of an information handling device 100. The information handling device 100 includes a processor 105, a memory 110, an IO module 115, a basic input/output system ("BIOS") module 120, a universal serial bus ("USB") module 125, a storage module 130, a network module 135, a peripheral component interconnect express ("PCIe") module 140, and a display 145. One of skill in the art will recognize that other configurations of an information handling device 100 or multiple information handling devices 100 may be employed with the embodiments described herein.

The processor 105, memory 110, the IO module 115, the BIOS module 120, the USB module 125, the storage module 130, the network module 135, the PCIe module 140, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 130. The storage module 130 may comprise at least one Solid State Device ("SSD"). In addition, the storage module 130 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110.

In addition, the processor 105 may communicate with the IO module 115. The IO module 115 may support and communicate with the BIOS module 120, the network module 135, the PCIe module 140, and the storage module 130.

The PCIe module 140 may communicate with the IO module 115 for transferring data or power to peripheral devices. The PCIe module 140 may include a PCIe bus for attaching the peripheral devices. The PCIe bus can logically connect several peripheral devices over the same set of connections. The peripherals may be selected from a printer, a scanner, or the like. The PCIe module 140 may also comprise an expansion card as is well known to those skilled in the art. In one embodiment, the PCIe module 140 is in communication with a display. Specifically, in one embodiment, the PCIe module comprises a PCIe expansion card in communication with the display. In one embodiment, the PCIe expansion card comprises a PCIe Mini Card. The display 145 may be a cathode ray tube ("CRT"), a liquid crystal display ("LCD") monitor, or the like.

The BIOS module 120 may communicate instructions through the IO module 115 to boot the information handling device 100, so that computer readable software instructions stored on the storage module 130 can load, execute, and assume control of the information handling device 100. The BIOS module 120 may comprise a coded program embedded on a chipset that recognizes and controls various devices that make up the information handling device 100. The BIOS module 120 may refer to various approaches to providing a firmware interface for booting an information handling device 100, including traditional BIOS, unified extensible firmware interface (UEFI), Open Firmware, and others. The BIOS module 120, in one embodiment, includes a storage device that stores the relevant instructions for booting. The storage device may be a solid state storage device, such as Flash memory. The BIOS module 120 may be a solid state storage device with relevant code that is attached to a motherboard of the information handling device 100.

The network module 135 may communicate with the IO module 115 to allow the information handling device 100 to communicate with other devices over a network. The devices may include routers, bridges, computers, printers, and the like. The USB module 125 may communicate with one or more USB compatible devices over a USB bus.

Figure 2:
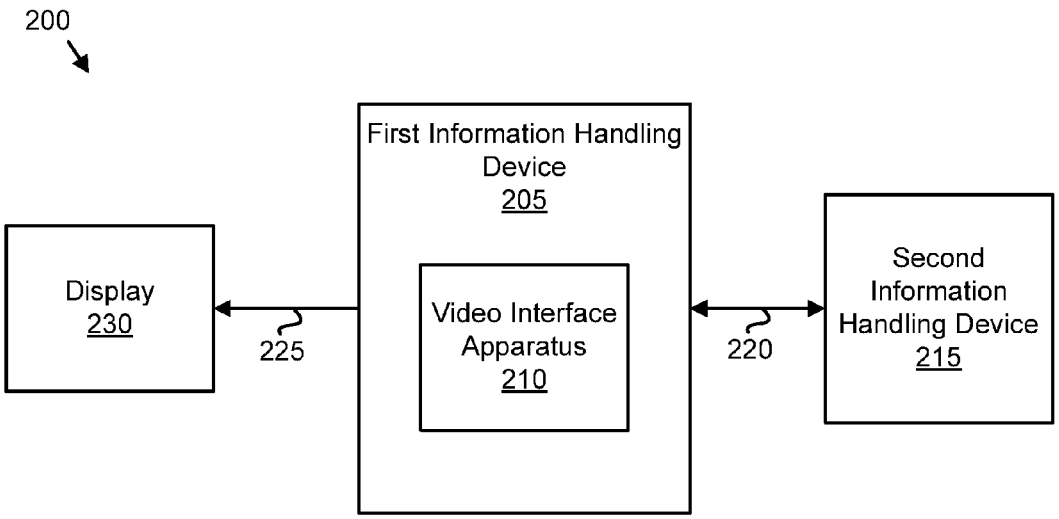
FIG. 2 is a schematic block diagram illustrating one embodiment of a system for a sleep state video interface of an information handling device in accordance with the present subject matter.

FIG. 2 depicts one embodiment of a system 200 for a sleep state video interface of an information handling device. The system 200 may allow a user to transmit video from one device 215, such as a smartphone, to the display 230 of another device 205, such as the display of a laptop or tablet computer. In addition, the system 200 may place the receiving device 205 into a sleep state to save power during the video transmission. The system 200 includes a first information handling device 205, a second information handling device 215, and a display 230. The first information handling device 205 includes a video interface apparatus 210.

Often, personal computers and laptops lack video input ports, leaving a user without the option of displaying video from another information handling device such as a mobile device. Furthermore, even information handling devices that include some form of video input typically receive video input while operating at full power. Consequently, in the depicted embodiment the first information handling device 205 includes a video input (e.g. a cable connection port) and the second information handling device 215 includes a video output. In one embodiment, the first information handling device 205 and the second information handling device 215 are coupled with a video connection 220 between the video output and video input. In one embodiment, the video connection 220 is a cable connection. In certain embodiments, the video connection is a two-way connection capable of transmitting data from the first information handling device 205 to the second information handling device 215 and from the second information handling device 215 to the first information handling device 205. Consequently, each information handling device 205, 215, in one embodiment, may have both video input and video output capabilities.

The second information handling device 215 may transmit a video signal over the video connection 220. A video signal, in one embodiment, includes digital video data and in certain embodiments, may also include digital audio data. The second information handling device 215 may transmit the video signal according to a digital video interface. In one embodiment, the digital video interface is a High-Definition Multimedia Interface (HDMI) interface, the video connection is an HDMI connection, and the video signal is an HDMI signal. In this embodiment, the first and second information handling devices 205 include HDMI ports for HDMI video input/output. In one embodiment, the digital video interface is a mobile high-definition link (MHL) interface. In other embodiments, the interface is a Digital Visual Interface (DVI) interface, a Firewire interface, or other suitable digital video interface. In one embodiment, the second information handling device 215 also includes and/or is in communication with a display.

In one embodiment, the second information handling device 215 transmits the video signal and the first information handling device 205 receives the video signal through the video connection 220. The first information handling device 205 transmits, conveys, and/or transfers 225 the video signal to the display 230. The display 230 may comprise one embodiment of the display 145 described above in relation to FIG. 1. In one embodiment, the display 230 is separate from the first information handling device 205 and is connected to the first information handling device 205 by, for example, a cable connection. In another embodiment, the display 230 is part of and/or integrated with the first information handling device 205. For example, the display 230 may be a laptop display, a tablet display, or the like.

In one embodiment, the video interface apparatus 210 enters the first information handling device 205 into a sleep state and allows the video signal to pass through the information handling device 205 while it is in the sleep state. As a result, the first information handling device 205 remains in a reduced power state while the video is displayed. The video interface apparatus 210 may enter the first information handling device 205 into the sleep state in response to various events such as a window of a user interface displaying the video on the first information handling device 205, transitioning into a full screen mode, in response to the first information handling device 205 receiving the video signal, and/or the like.

The first information handling device 205 and/or the second information handling device 215 may include memory, a storage device storing computer readable programs, and a processor that executes the computer readable programs as is known to those skilled in the art. The first and/or second information handling devices 205, 215 may comprise embodiments of information handling device 100 depicted in FIG. 1 or comprise at least a portion of the components of the information handling device 100. In one embodiment, the second information handling device 215 is a portable or handheld device such as a personal desktop assistant ("PDA"), a tablet computer, a slate computer, an e-Book reader, a mobile phone, a smartphone, and the like. In one embodiment, the first information handling device 205 is a desktop computer, a portable computer, a tablet computer, a laptop computer, a server, a mainframe computer, and/or the like.

In one embodiment, all or a portion of the video interface apparatus 210 comprises a computer readable program stored and executed by the first information handling device 205. In one embodiment, the video interface apparatus 210 includes an application executing on an operating system of the first information handling device 205 and/or is integrated with the operating system.

Figure 3:
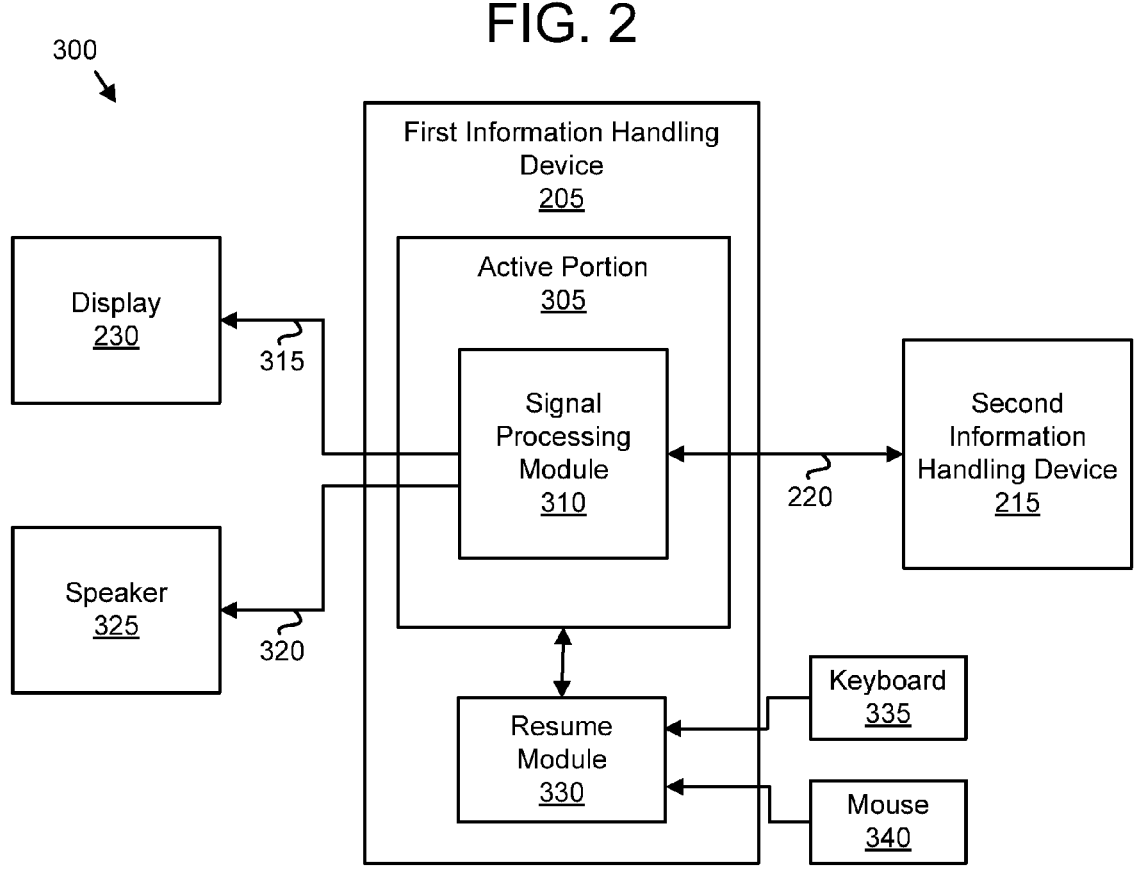
FIG. 3 is a schematic block diagram illustrating another embodiment of a system for a sleep state video interface of an information handling device in accordance with the present subject matter.

FIG. 3 depicts another embodiment of a system 300 for a sleep state video interface of an information handling device. FIG. 3 depicts the first information handling device 205 communicating with the second information handling device 215 by way of a video connection 220, and the first information handling device 205 communicating with the display 230. Moreover, these elements may be substantially similar to the like-named elements in FIG. 2. In one embodiment, an active portion 305 of the first information handling device 205 remains powered on and active while the first information handling device 205 is in the sleep state. In one embodiment, the active portion 305 receives the video signal, processes and video signal, and transmits the video signal to the display 230 while the first information handling device 205 is in the sleep state, thus allowing the video signal to pass through the first information handling device 205 while it remains in the low power sleep state. FIG. 3 depicts one embodiment of the active portion 305 of the first information handling device 205 that remains powered on.

In one embodiment, the active portion 305 comprises an expansion card of the first information handling device 205. In one embodiment, the expansion card is an mPCIe card and may comprise at least a portion of the PCIe module 140 depicted above in FIG. 1. The active portion 305, in one embodiment, includes a video input that may be substantially similar to the video input described above in relation to the first information handling device 205. In the depicted embodiment, the active portion 305 includes a signal processing module 310. The second information handling device 215 transmits the video signal to the signal processing module 310. The signal processing module 310 may transmit and/or convey audio data of the video signal to a speaker 325 and may transmit and/or convey video data of the video signal to the display 230. In one embodiment, the signal processing module 310 converts the video signal to a signal suitable for displaying by the display 230. For example, in one embodiment, the signal processing module 310 converts an HDMI signal to a low voltage differential signal (LVDS).

In one embodiment, the second information handling device 215 comprises a portable information handling device that transmits a video signal in a mobile high-definition link (MHL) protocol. In this embodiment, the signal processing module 310 converts the MHL video signal from the second information handling device 215 to HDMI.

In one embodiment, the active portion 305 maintains power while the first information handling device 205 is in the sleep state. For example, in one embodiment, the active portion is an mPCIe expansion card that receives power from the host computer (the first information handling device 205) through a pin on the PCI-e connector. In one embodiment, when the first information handling device 205 is asleep, the voltages are still available to the expansion card. In one embodiment, video processing of the signal processing module 310 is independent of the first information handling device 205. The signal processing module 310, in one embodiment, continues processing the video signal while the first information handling device 205 is in the sleep state. In one embodiment, processing the video signal refers to receiving the video signal, converting the video signal, and/or conveying the video signal to the display 230. In one embodiment, the signal processing module 310 comprises a portion of the video interface apparatus 210. In one embodiment, at least a portion of the video interface apparatus 210 is implemented on the active portion 305.

The resume module 330, in one embodiment, communicates with the active portion 305 through, for example, a serial connection or other suitable connection. In one embodiment, the resume module 330 communicates with one or more peripheral devices such as a keyboard 335 and a mouse 340. In one embodiment, the resume module 330 is an embedded controller. In certain embodiments, the resume module 330 may detect and/or receive a predetermined signal from the mouse 340 and/or keyboard 335 to wake up the first information handling device 205 from the sleep state. The resume module 330 may wake the first information handling device 205 from the sleep state in response to the predetermined signal. For example, in one embodiment, the predetermined signal comprises a certain key combination or button press to wake the first information handling device 205.

Figure 4A:
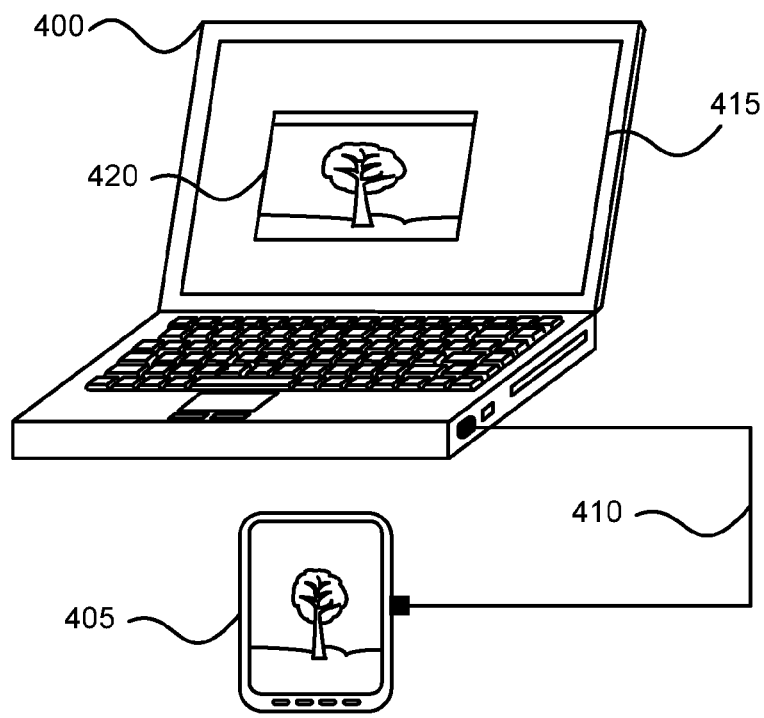
FIG. 4A is a perspective view illustrating one embodiment of a smartphone transmitting a video signal to a display of a laptop computer in accordance with the present subject matter.

FIG. 4A depicts one embodiment of a smartphone 405 transmitting a video signal to a display 415 of a laptop computer 400. The laptop computer 400 and the smartphone 405 may be embodiments, respectively, of the first and second information handling devices 205, 215 of FIGS. 2 and 3. In the depicted embodiment, the smartphone 405 is connected to the laptop computer 400 with a video connection 410. The smartphone 405, in the depicted embodiment, plays a video and transmits the video signal comprising the video over the video connection 410 to the display 415 of the laptop computer 400. In the depicted embodiment, the laptop computer 400 displays the video in a window 420 of a user interface of the laptop computer 400. In the depicted embodiment, the window 420 occupies a sub region of an area of the display 415.

Figure 4B:
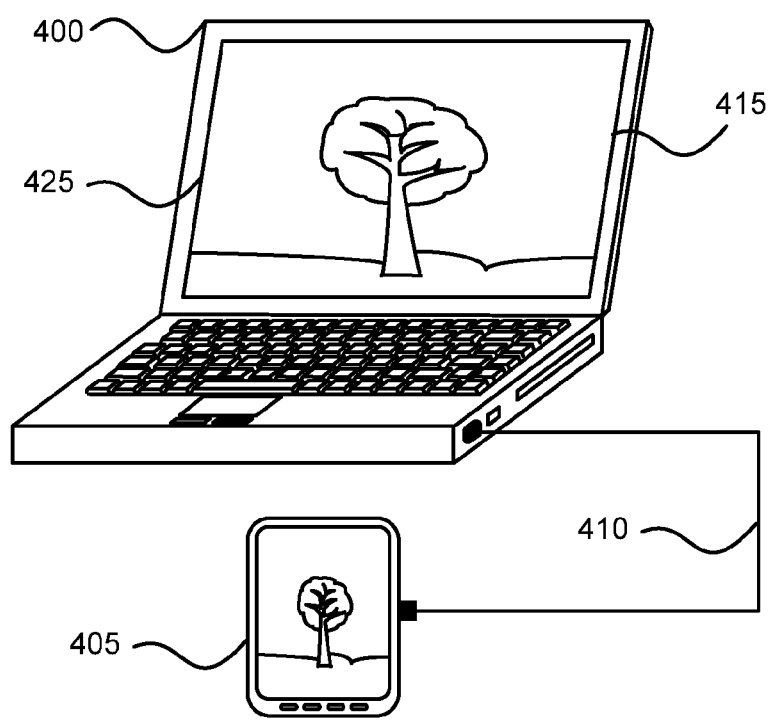
FIG. 4B is a another perspective view of the smartphone and the laptop computer of FIG. 4A in accordance with the present subject matter.

The laptop computer 400 may enter the sleep state in response to a variety of events. FIG. 4B depicts one embodiment of one such event. FIG. 4B depicts another embodiment of the laptop computer 400 and smartphone 405 of FIG. 4A. In the depicted embodiment, the laptop computer 400 displays the video from the smartphone 405 in a full screen mode 425 on the display 415. In one embodiment, the laptop computer 400 may enter a sleep state in response to the window, in which the video is initially displayed, entering into a full screen mode 425. For example, the user may trigger the window to enter into the full screen mode 425 and the laptop computer 400 may enter the sleep state in response to the window entering the full screen mode 425.

Figure 5:
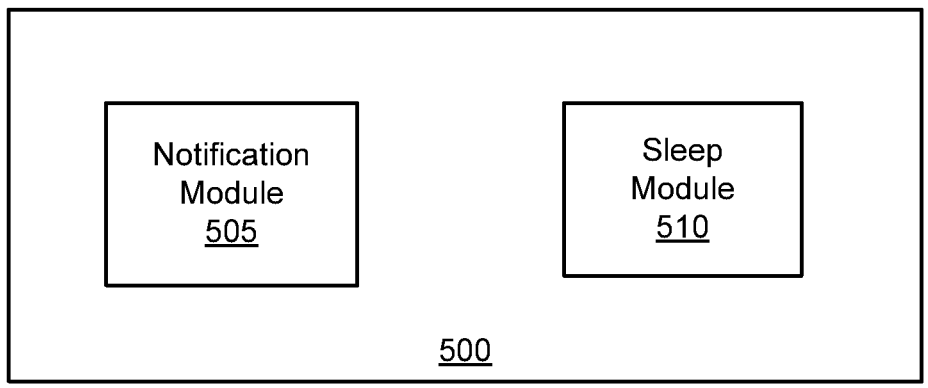
FIG. 5 is a schematic block diagram illustrating one embodiment of an apparatus for a sleep state video interface of an information handling device in accordance with the present subject matter.

FIG. 5 illustrates one embodiment of an apparatus 500 for a sleep state video interface of an information handling device. The apparatus 500 may comprise one embodiment of the video interface apparatus depicted in FIG. 2. The apparatus 500 includes a notification module 505 and a sleep module 510. FIG. 5 also refers to FIGS. 2 and 3, like numbers referring to like elements.

The notification module 505, in one embodiment, receives a sleep notification to place an information handling device 205 into a sleep state. The information handling device 205, in one embodiment, comprises one embodiment of the first information handling device 205 depicted in FIG. 2. The information handling device 205 may receive a video signal. In one embodiment, a second information handling device 215 transmits the video signal to the information handling device 205. The second information handling device 215 may comprise one embodiment of the second information handling device 215 depicted in FIG. 2. In one embodiment, the video signal is an MHL signal, an HDMI signal or other digital video signal. In one embodiment, the video signal includes video comprises video data for a screen of the second information handling device 215. Specifically, the video signal may be a continuous screen capture of the second information handling device 230 (e.g. showing video content the second information handling device 230 has/would have on its display). In one embodiment, the information handling device 205 communicates with and/or is integrated with a display 230 as described above.

The sleep notification, in one embodiment, is a signal, trigger, and/or notification to place the information handling device 205 in a sleep state. The sleep notification may include a predetermined event and/or a notification of a predetermined event. The sleep notification may originate from within the information handling device 205, such as from an application executing on the information handling device 205.

For example, in one embodiment, the sleep notification includes a setting change of an application and/or operating system executing on the information handling device 205. In a further embodiment, the setting change may be a setting change on a window of a user interface of the information handling device 205. The user interface may comprise a user interface of an application executing on the information handling device 205 and/or an operating system executing on the information handling device 205.

The window, in one embodiment, displays video of the video signal on the user interface of the information handling device 205. The setting change may comprise a size change of the window, a maximization of the window, the window entering into a full screen mode, or the like. For example, in one embodiment, the information handling device 205 executes a Windows® operating system from Microsoft® and the window is a window displayed by the operating system and/or an application running on the operating system. In one embodiment, the video transmitted by the second information handling device 215 is displayed in the window, which, as described above in relation to FIG. 4A, may be sized initially as a sub region of the display 230. In one embodiment, if a user and/or application maximizes the window (triggers the window to expand to cover an entire area of the display 230) and/or causes the window to enter into a full screen mode, the sleep notification may comprise an indication that of the window becoming maximized and/or entering into the full screen mode. In one embodiment, the sleep notification may be generated, as described below, in response to detecting the information handling device 205 receive the video signal from the second information handling device 215.

The sleep notification may also originate from a source external to the information handling device 205 such as from the second information handling device 215. For example, in one embodiment, the notification module 505 receives the sleep notification from the second information handling device 215 in communication with the information handling device 205. The second information handling device 215 may be the source of the video signal transmitted to the information handling device 205. In one embodiment, the second information handling device 215 transmits a signal to the sleep notification module 505 through an HDMI connection. For example, a user may be transmitting video from his or her smartphone (e.g. the second information handling device 215) to a laptop computer (e.g. the information handling device 205) with an HDMI video connection and may enter a command on the smartphone to put the laptop computer to sleep. The smartphone may transmit the sleep notification to the sleep notification module 505 in response to the user entering the command. In one embodiment, the second information handling device 215 transmits the sleep notification in response to receiving a notification from the information handling device 205 of a window setting change or other indication that the information handling device 205 should be placed into the sleep state. For example, a user may enter a full screen mode with the video on the user's laptop and the laptop computer may transmit a notification that the window has been converted to the full screen mode to the user's smartphone which is transmitting the video signal. The user's smartphone may transmit the sleep notification to the laptop computer.

The sleep module 510, in one embodiment, enters the information handling device 205 into the sleep state in response to the notification module 505 receiving the sleep notification. The sleep state may comprise one of various low power states of the information handling device 205 and/or an operating system executing on the information handling device 205. In one embodiment, the sleep state is an Advanced Configuration and Power Interface (ACPI) state such as an S1, S2, S3, or S4 state. In certain embodiments, the sleep state may comprise any suitable state in which the information handling device 205 and/or an operating system executing and/or managing the information handling device 205 is maintained in a lower power state where at least a subset of components and/or processes of the information handling device 205 and/or operating system are suspended, such as a processor, non-volatile memory, or the like.

In one embodiment, entering the information handling device 205 into the sleep state refers to signaling the information handling device 205 and/or an operating system managing the information handling device 205 to enter into the sleep state, issuing a command to an operating system to enter into the sleep state, or otherwise causing the information handling device 205 and/or operating system to enter into the sleep state.

In one embodiment, the sleep module 510 enters the information handling device 205 into the sleep state using an operating system command, such as an Application Programming Interface (API) call. For example, with a Windows® operating system, the sleep module 510 may use the Windows.Forms.Application object's SetSuspendState command to enter the operating system into the sleep state.

In one embodiment, a video signal passes through the information handling device 205 to a display 230 as the information handling device 205 is in the sleep state. The video signal may be transmitted from the second information handling device 215 as described above. In one embodiment, the video signal passing through the information handling device 205 to the display 230 means that a portion of the information handling device 205, such as an expansion card, maintains power, and continues to process the video signal while the information handling device 205 and/or operating system managing the information handling device 205 is in the sleep state as described above in relation to FIG. 3. In one embodiment, the video signal passing through the information handling device 205 further includes the video signal being received, processed, and output to the display 230 as described above in relation to FIG. 3.

Figure 6:
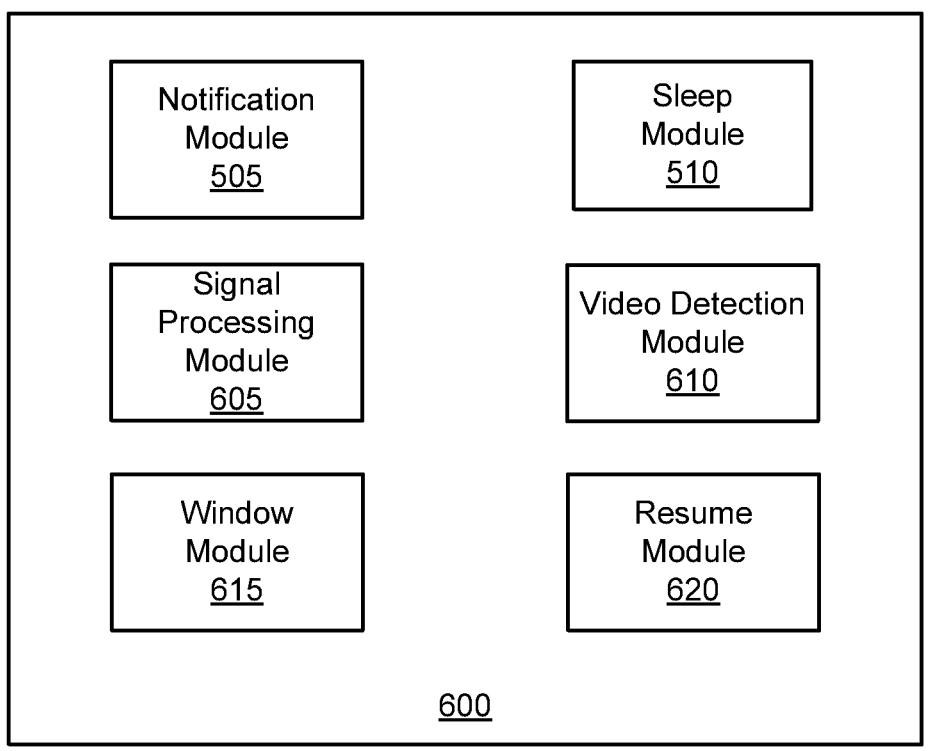
FIG. 6 is a schematic block diagram illustrating another embodiment of an apparatus for a sleep state video interface of an information handling device in accordance with the present subject matter.

FIG. 6 illustrates another embodiment of an apparatus 600 for a sleep state video interface of an information handling device 205. The apparatus 600 may comprise one embodiment of the video interface apparatus depicted in FIG. 2. The apparatus 600 includes the notification module 505 and the sleep module 510, which may be substantially similar to the like named modules of FIG. 5. In addition, the apparatus 600 includes a signal processing module 605, a video detection module 610, a window module 615, and a resume module 620.

The signal processing module 605, in one embodiment, receives the video signal and transmits the video signal to the display 230. The signal processing module 605, in one embodiment, maintains power while the information handling device 205 is in the sleep state. In one embodiment, the signal processing module 605 continues processing the video signal while the information handling device 205 is in the sleep state and/or passes through the information handling device 205 to a display 230 as the information handling device 205 is in the sleep state. The signal processing module 605, in one embodiment, comprises one embodiment of the signal processing module 310 described above in relation to FIG. 3.

The video detection module 610, in one embodiment, detects the information handling device 205 receiving the video signal. The video signal, in one embodiment, is an HDMI signal. In this embodiment, the video detection module 610 may detect an incoming HDMI signal. In one embodiment, the video detection module 610 communicates with the signal processing module 605 receiving the video signal as described above in relation to FIG. 3. In one embodiment, the video detection module 610 sends the sleep notification to the sleep notification module 505 in response to detecting the information handling device 205 receiving the video signal. For example, a user may connect a second information handling device 215 to the information handling device 205 and begin transmitting video and the information handling device 205 may enter the sleep state in response to the transmitted video.

The window module 615, in one embodiment, displays video of the video signal in a window on a user interface of the information handling device 205. In one embodiment, the window module 615 displays the video in the window in response to the detection module detecting the information handling device 205 receiving the video signal. For example, in one embodiment, the information handling device 205 executes a Windows® operating system from Microsoft® and the window is a window displayed by a user interface of the operating system and/or an application running on the operating system. In one embodiment, the video transmitted by the second information handling device 215 is displayed in the window, which, as described above in relation to FIG. 4A, may be sized initially as a sub region of the display 230. The window module 615, in one embodiment, receives, references, and/or obtains the video signal from the active portion 305 (e.g. the expansion card) and displays video of the video signal in the window.

In one embodiment, the sleep notification comprises an indication of a setting change of the window and the sleep module 510 enters the information handling device 205 into the sleep state in response to the setting change of the window. In one embodiment, the setting change comprises a maximization of the window. In one embodiment, a maximization of the window occurs when the window expands to cover an entire displayable area of the display 230. In certain embodiments, borders and/or toolbars of the window may remain visible when the window is maximized. In one embodiment, the setting change comprises converting the window into a full screen mode. In one embodiment, the window enters into a full screen mode by expanding to fill the entire displayable area of the display 230. In certain embodiments, borders and/or toolbars of the window may be hidden during full screen mode and/or a resolution of the display 230 may be changed during a full screen mode. In one embodiment, the window module 615 issues the sleep notification to the sleep notification module 505 in response to detecting a setting change of the window. In one embodiment, the window module 615 detects the setting change of the window from a signal from the operating system indicating the setting change.

The resume module 620, in one embodiment, receives a resume notification and/or wakes the information handling device 205 from the sleep state in response to the resume notification. The resume module 620 may comprise one embodiment of the resume module 330 depicted in FIG. 3. In one embodiment, the resume notification includes a notification from a second information handling device 215 in communication with the information handling device 205. For example, in one embodiment, the second information handling device 215 may transmit the resume notification across the video connection (e.g. the HDMI connection) to the resume module 620. In one embodiment, the expansion card communicates with the resume module 620 and at least a portion of the resume module 620 comprises a microcontroller that communicates with other components of the information handling device 205 to wake the information handling device 205 from the sleep state in response to the resume notification. Specifically, in one embodiment, the resume module 620 wakes up from the sleep state in response to the resume notification. The resume module 620 may then wake up other components of the information handling device 205 by transmitting additional signals to the other components.

In one embodiment, the resume notification includes a button press and/or one or more keystrokes. In this embodiment, the resume module 620 may be in communication with a keyboard and/or a mouse and may receive input from the keyboard and/or mouse to wake the information handling device 205. For example, the resume notification may include a certain keystroke combination. If the resume module 620 detects the keystroke combination, the resume module 620 may wake up the information handling device 205.

Figure 7:
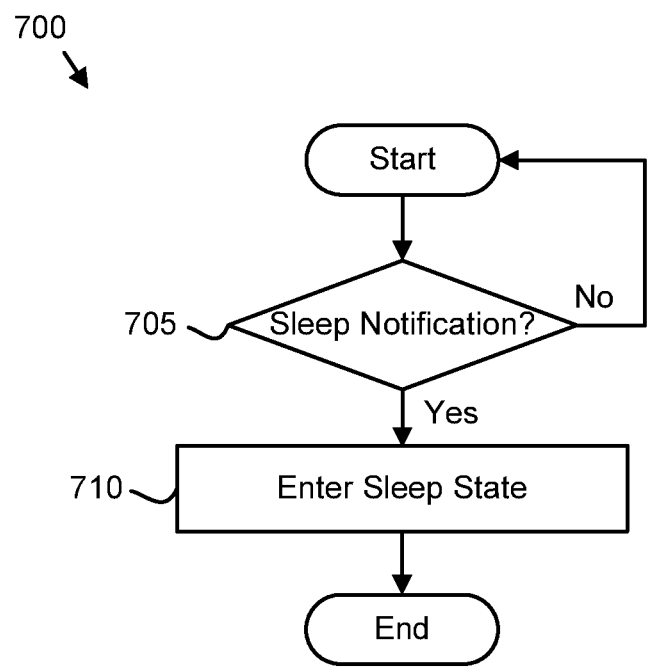
FIG. 7 is a schematic flow chart diagram illustrating one embodiment of a method for a sleep state video interface of an information handling device in accordance with the present subject matter.

FIG. 7 illustrates one embodiment of a method 700 for a sleep state video interface of an information handling device 205. The method 700 begins and the notification module 505 monitors 705 for a sleep notification to place an information handling device 205 into a sleep state. If the notification module 505 receives 705 a sleep notification, the sleep module 510 enters 710 the information handling device 205 into the sleep state. The video signal, in one embodiment, passes through the information handling device 205 to a display 230 as the information handling device 205 is in the sleep state. The method 700 ends.

Figure 8:
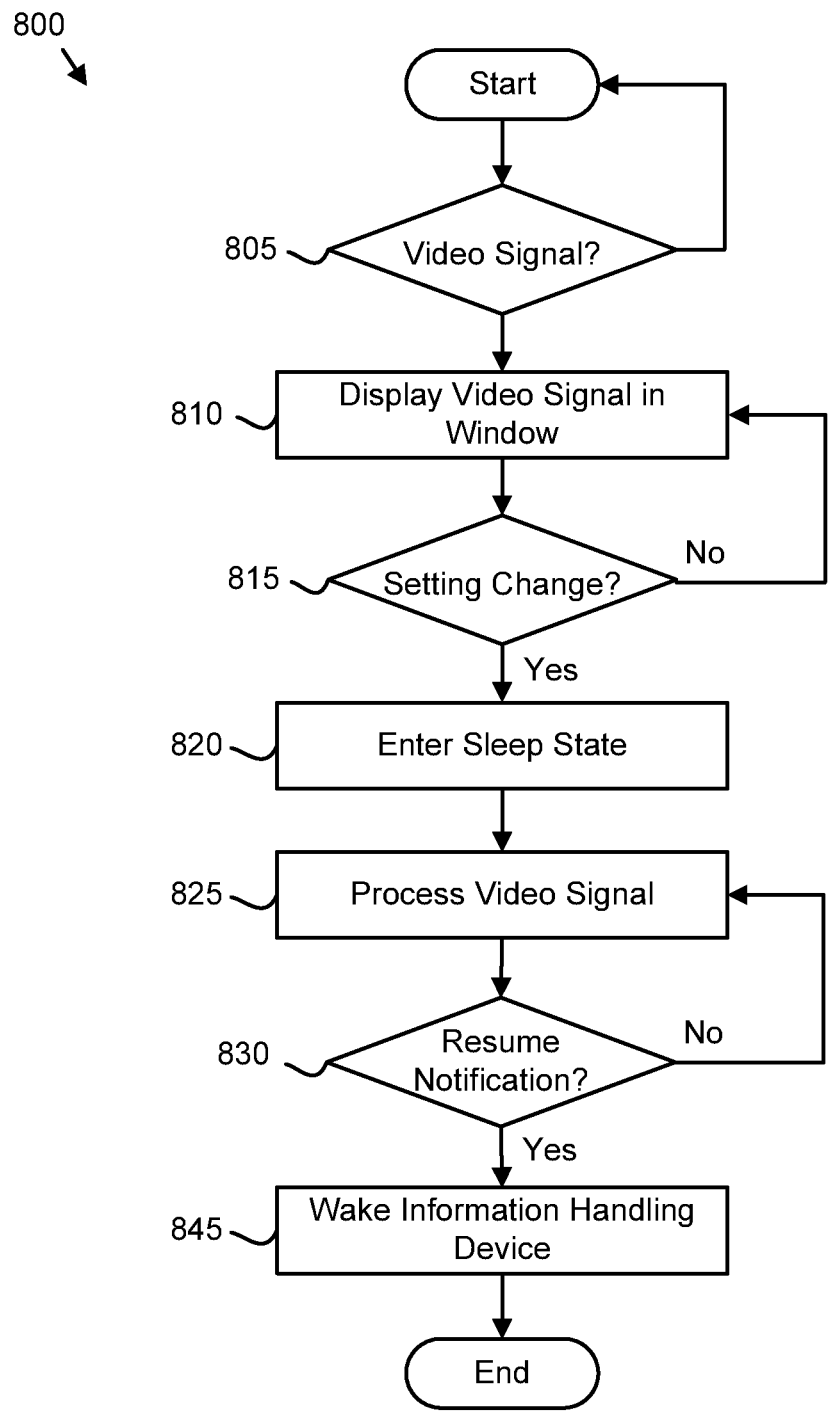
FIG. 8 is a schematic flow chart diagram illustrating another embodiment of a method for a sleep state video interface of an information handling device in accordance with the present subject matter.

FIG. 8 illustrates one embodiment of a method 800 for a sleep state video interface of an information handling device 205. The method 800 begins and the video detection module 610 monitors 805 for an information handling device 205 receiving a video signal. If the detection module 610 detects 805 the information handling device 205 receive the video signal, the window module 615 displays 805 video of the video signal in a window on a user interface of the information handling device 205. If notification module 505 does not 815 detect a setting change of the window, the window module 615 continues 810 to display video of the video signal in the window. Alternatively, if the notification module 505 detects 815 a setting change of the window (e.g. the window converts into full screen mode or is maximized), the sleep module 510 enters 820 the information handling device 205 into a sleep state. The signal processing module 605 processes 825 the video signal while the information handling device 205 is in the sleep state.

If the resume module 620 does not 830 detect a resume notification, the signal processing module 605 continues to process 825 the video signal. If the resume module 620 detects 830 a resume notification, the resume module 620 wakes 845 the information handling device 205 and the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a storage device storing machine-readable code;
    a processor executing the machine-readable code, the machine-readable code comprising:
    a video detection module detecting a first information handling device receiving a video signal from a second information handling device and generating a sleep notification in response to detecting the first information handling device receiving the video signal, wherein the video signal comprises digital video data;
    a notification module receiving the sleep notification to place the first information handling device into a sleep state; and
    a sleep module entering the first information handling device into the sleep state in response to the notification module receiving the sleep notification, the video signal passing from the second information handling device through the first information handling device to a display as the first information handling device is in the sleep state.

2. The apparatus of claim 1, further comprising a window module displaying video of the video signal in a window on a user interface of the first information handling device in response to the detection module detecting the first information handling device receiving the video signal.

3. The apparatus of claim 2, wherein the sleep notification comprises an indication of a setting change of the window and wherein the sleep module enters the first information handling device into the sleep state in response to the setting change of the window.

4. The apparatus of claim 3, wherein the setting change comprises a maximization of the window.

5. The apparatus of claim 3, wherein the setting change converts the window into a full screen mode.

6. The apparatus of claim 1, wherein the notification module receives the sleep notification from the second information handling device in communication with the information handling device, the second information handling device transmitting the video signal to the information handling device.

7. The apparatus of claim 1, further comprising a resume module waking the first information handling device from the sleep state in response to a resume notification, the resume notification comprising one of a button press, one or more keystrokes, and a notification from the second information handling device in communication with the first information handling device.

8. The apparatus of claim 1, further comprising a signal processing module receiving the video signal and transmitting the video signal to the display, the signal processing module maintaining power while the first information handling device is in the sleep state.

9. A method comprising:
    detecting a first information handling device receiving a video signal from a second information handling device and generating a sleep notification in response to detecting the first information handling device receiving the video signal, wherein the video signal comprises digital video data;
    receiving the sleep notification to place the first information handling device into a sleep state; and
    entering the first information handling device into the sleep state in response to receiving the sleep notification, the video signal passing from the second information handling device through the first information handling device to the first display as the first information handling device is in the sleep state.

10. The method of claim 9, further comprising:
    displaying video of the video signal in a window on a user interface of the first information handling device in response to detecting the first information handling device receiving the video signal.

11. The method of claim 10, wherein the sleep notification comprises an indication of a setting change of the window and wherein entering the first information handling device into the sleep state occurs in response to the setting change of the window.

12. The method of claim 11, wherein the setting change converts the window into a full screen mode.

13. The method of claim 9, further comprising waking the first information handling device from the sleep state in response to a resume notification, the resume notification comprising one of a button press, one or more keystrokes, and a notification from the second information handling device in communication with the first information handling device.

14. A computer program product comprising a non-transitory storage device storing machine readable code executed by a processor to perform the operations of:
    detecting a first information handling device receiving a video signal from a second information handling device and generating a sleep notification in response to detecting the first information handling device receiving the video signal, wherein the video signal comprises digital video data;
    receiving the sleep notification to place the first information handling device into a sleep state, wherein the first information handling device comprises a first display and the second information handling device comprises a second display, wherein the first display is larger in size than the second display; and
    entering the first information handling device into the sleep state in response to receiving the sleep notification, the video signal passing from the second information handling device through the first information handling device to the display as the first information handling device is in the sleep state.

15. The computer program product of claim 14, further comprising operations for:
    displaying video of the video signal in a window on a user interface of the first information handling device in response to detecting the first information handling device receiving the video signal.

16. The computer program product of claim 15, wherein the sleep notification comprises an indication of a setting change of the window and wherein entering the first information handling device into the sleep state occurs in response to the setting change of the window.

17. The computer program product of claim 16, wherein the setting change converts the window into a full screen mode.

18. The computer program product of claim 14, further comprising operations for waking the first information handling device from the sleep state in response to a resume notification, the resume notification comprising one of a button press, one or more keystrokes, and a notification from the second information handling device in communication with the first information handling device.

* * * * *